(12) United States Patent
Chen et al.

(10) Patent No.: US 12,206,331 B2
(45) Date of Patent: Jan. 21, 2025

(54) DC-DC CONVERTER WITH HYBRID CURRENT SENSING

(71) Applicant: TEXAS INSTRUMENTS INCORPORATED, Dallas, TX (US)

(72) Inventors: Rengang Chen, Bethlehem, PA (US); Bo Wang, Easton, PA (US); Evan Reutzel, Center Valley, PA (US); Dattatreya Baragur Suryanarayana, Bengaluru (IN); Bhaskar Ramachandran, Bengaluru (IN); Preetam Tadeparthy, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 121 days.

(21) Appl. No.: 17/875,214

(22) Filed: Jul. 27, 2022

(65) Prior Publication Data
US 2024/0039406 A1     Feb. 1, 2024

(51) Int. Cl.
H02M 3/158   (2006.01)
H02M 1/00    (2006.01)

(52) U.S. Cl.
CPC ......... *H02M 3/158* (2013.01); *H02M 1/0009* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088;

(Continued)

(56) References Cited

U.S. PATENT DOCUMENTS 7,936,160 B1 *  5/2011  Sheehan .............. H02M 3/156
                                                    323/288
9,184,651 B2 * 11/2015  Nguyen ............. G01R 19/0092

(Continued)

*Primary Examiner* — Jeffrey A Gblende
(74) *Attorney, Agent, or Firm* — Michelle F. Murray; Frank D. Cimino

(57) ABSTRACT

A DC-DC converter includes a current sense circuit. The current sense circuit includes a sense current output, an inductor current measurement circuit, an inductor current emulation circuit, a first switch, and a second switch. The inductor current measurement circuit has an output. The inductor current emulation circuit has an output. The first switch is coupled between the output of the inductor current measurement circuit and the sense current output. The second switch is coupled between the output of the inductor current emulation circuit and the sense current output.

20 Claims, 7 Drawing Sheets

(58) Field of Classification Search
CPC ... H02M 1/0048; H05B 39/048; B23K 11/24; H04B 2215/069
See application file for complete search history.

(56) References Cited

U.S. PATENT DOCUMENTS

| | | | |
|---|---|---|---|
| 9,231,478 B2* | 1/2016 | Sasao | H02M 1/0845 |
| 9,471,077 B2* | 10/2016 | Kobayashi | G05F 1/575 |
| 9,716,432 B2* | 7/2017 | Ouyang | H02M 3/158 |
| 10,892,683 B2* | 1/2021 | Nam | H02M 3/157 |

* cited by examiner

DC-DC CONVERTER WITH HYBRID CURRENT SENSING

BACKGROUND

A DC-DC converter is an electronic circuit that converts an input direct current (DC) voltage into one or more DC output voltages that are higher or lower in magnitude than the input DC voltage. A DC-DC converter that generates an output voltage lower than the input voltage is termed a buck or step-down converter. A switching regulator that generates an output voltage higher than the input voltage is termed a boost or step-up converter.

Some DC-DC converter topologies include a drive/power switch coupled at a snitch node to an energy storage inductor/transformer. Electrical energy is transferred through the energy storage inductor/transformer to a load by alternately opening and closing the switch as a function of a switching signal. The amount of electrical energy transferred to the load is a function of the ON/OFF duty cycle of the switch and the frequency of the switching signal. DC-DC converters are widely used in electronic devices, particularly battery powered devices, such as portable cellular phones, laptop computers, and other electronic systems in which efficient use of power is desirable.

SUMMARY

In one example, a DC-DC converter includes a current sense circuit. The current sense circuit includes a sense current output, an inductor current measurement circuit, an inductor current emulation circuit, a first switch, and a second switch. The inductor current measurement circuit has an output. The inductor current emulation circuit has an output. The first switch is coupled between the output of the inductor current measurement circuit and the sense current output. The second switch is coupled between the output of the inductor current emulation circuit and the sense current output.

In another example, a DC-DC converter includes a current sense circuit. The current sense circuit includes a sense current output, an inductor current measurement circuit, an inductor current emulation circuit, and a switch network. The inductor current measurement circuit is configured to generate a current measurement signal representative of a measurement of an inductor current. The inductor current emulation circuit is configured to generate a current emulation signal representative of an emulation of the inductor current. The switch network is coupled to the sense current output, the inductor current measurement circuit, and the inductor current emulation circuit. The switch network is configured to switch the current emulation signal to the sense current output during a first portion of a DC-DC converter switching cycle, and switch the current measurement signal to the sense current output during a second portion of the DC-DC converter switching cycle.

In a further example, a system includes a processor and a DC-DC converter coupled to the processor. The DC-DC converter includes a current sense circuit. The current sense circuit includes a sense current output, an inductor current measurement circuit, an inductor current emulation circuit, a first switch, a second switch, and a third switch. The inductor current measurement circuit has an output. The inductor current emulation circuit has an output. The first switch is coupled between the output of the inductor current measurement circuit and the sense current output. The second switch is coupled between the output of the inductor current emulation circuit and the sense current output. The third switch is coupled between the output of the inductor current measurement circuit and the output of the inductor current emulation circuit.

BRIEF DESCRIPTION OF THE DRAWINGS

For a detailed description of various examples, reference will now be made to the accompanying drawings in which.

DETAILED DESCRIPTION

As processor (e.g., central processing unit (CPU), graphics processing unit (GPU), communication processor, etc.) performance increases, processor power requirements also increase. For example, a high-performance processor may demand high currents (e.g., >1000 amperes (A)), high load transient steps, high slew rate (e.g., >1000 A/microsecond), and low regulation (<±3%). The current sense circuitry used in some DC-DC converters may have load transient response limitations, especially when the pulse width modulator (PWM) pulses are low for relatively long periods as loading decreases. Current sense errors can trigger anomalies, such as output voltage overshoot, that degrade system performance.

Trans-inductor voltage regulators are multi-phase DC-DC converters in which each phase of the converter includes an output inductor that is the secondary winding of a transformer, and the primary windings of the transformers are connected in series. Trans-inductor voltage regulators can provide fast transient response to meet demands of high-performance processors. However, transient response may be slowed if the current sensing is inaccurate, resulting in increased over/undershoot settling times.

The DC-DC converters described herein include current sense circuits that provide accurate representations of inductor current with long PWM low pulse times, and with trans-inductor voltage regulators and other DC-DC converter architectures. The current sense circuits described herein include current emulation circuitry and current measurement circuitry. The current sense circuits combine the outputs of the current emulation circuitry and the current measurement circuitry to produce an accurate sense signal over the entire switching cycle.

Figure 1:
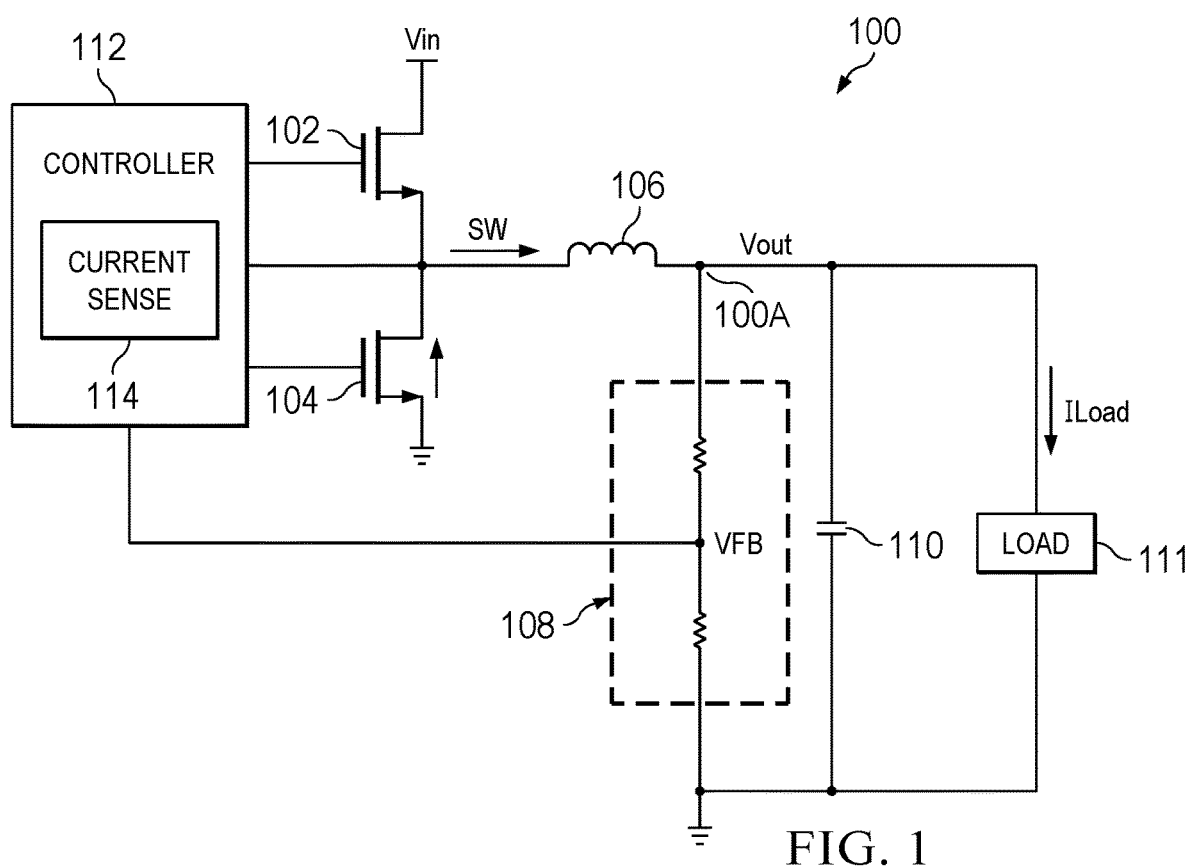
FIG. 1 is a block diagram for an example buck DC-DC converter that includes a hybrid emulation/measurement current sense circuit as described herein.

FIG. 1 is a block diagram for an example DC-DC converter 100 that includes a hybrid emulation/measurement current sense circuit as described herein. The DC-DC converter 100 is a buck converter, and includes a high-side switching transistor 102, a low-side switching transistor 104, an inductor 106, a voltage divider 108, an output capacitor 110, and a controller 112. The DC-DC converter 100 powers a load 111.

The controller 112 controls the high-side switching transistor 102 and the low-side switching transistor 104 to charge and discharge the inductor 106. When the high-side switching transistor 102 is turned on and the low-side switching transistor 104 is turned off, current flows from through the high-side switching transistor 102 to charge the inductor 106. When the low-side switching transistor 104 is turned on and the high-side switching transistor 102 is turned off, current flows through the low-side switching transistor 104 as the inductor 106 is discharged. Current flowing from the inductor 106 charges the output capacitor 110 and powers the load 111.

The voltage divider 108 is coupled to the output voltage terminal 100A of the DC-DC converter 100. The voltage divider 108 divides the output voltage (Vout) of the DC-DC converter 100 to generate a feedback voltage (VFB) that is proportional to Vout. The controller 112 compares VFB to a reference voltage to generate an error signal used to control the high-side switching transistor 102 and low-side switching transistor 104.

The controller 112 includes a current sense circuit 114. The current sense circuit 114 is coupled to the low-side switching transistor 104 for measurement of the current flowing through the inductor 106 (and into the output capacitor 110 and the load 111) as the inductor 106 is discharged. The current sense circuit 114 is a hybrid emulation/measurement current sense circuit that includes a current measurement circuit and a current emulation circuit. The current measurement circuit measures the current flowing through the inductor 106 by measuring the current flowing through the low-side switching transistor 104 when the low-side switching transistor 104 is on. The current emulation circuit estimates the current flowing in the inductor 106 when the low-side switching transistor 104 is off (e.g., when the high-side switching transistor 102 is on). The current sense circuit 114 generates a sense signal based on the measured inductor current and the emulated inductor current to improve sensing accuracy.

While the DC-DC converter 100 is illustrated as a buck converter, implementations of the current sense circuit 114 may be applied in a boost converter, a buck-boost converter, or other type of single or multi-phase DC-DC converter. Implementations of the DC-DC converter 100 may be used in a wide variety of applications that benefit from accurate current sensing. For example, the DC-DC converter 200 may be used in servers, or other types of computers, network attached storage devices, or other electronic systems.

Figure 2:
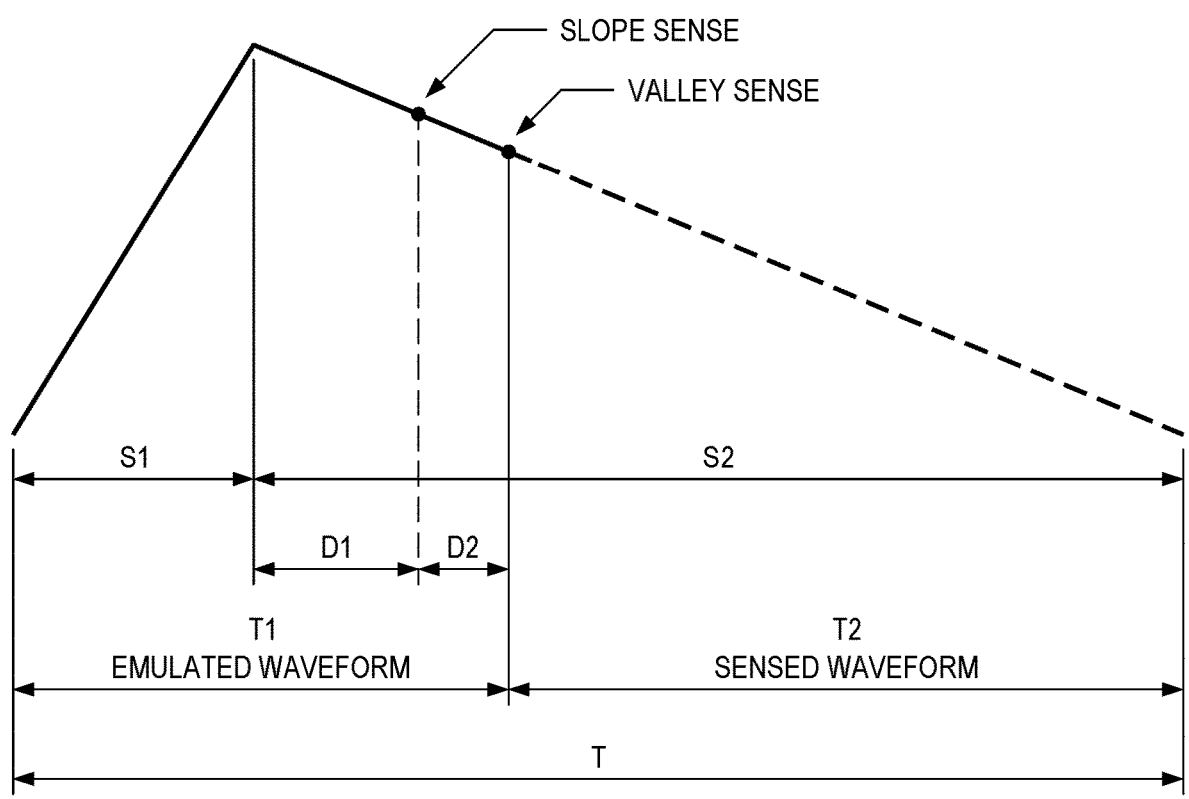
FIG. 2 is a graph illustrating operation of the hybrid emulation/measurement current sense circuit of FIG. 1.

FIG. 2 is a graph illustrating current sensing in the current sense circuit 114 over a switching cycle of the DC-DC converter 100. Time (T) represents the duration of a switching cycle of the DC-DC converter 100. In interval S1, the high-side switching transistor 102 is active to charge the inductor 106. In interval S2, the low-side switching transistor is active to discharge the inductor 106. D1 is a blanking interval initiated at activation of the low-side switching transistor 104. D2 defines a predetermined sensing time following D1. After expiration of D1, in interval T2, the current sense circuit 114 provides the actual measured inductor current (measured as the current flowing through the low-side switching transistor 104) as the sensed inductor current. Thus, in interval T2, the sensed inductor current matches the actual inductor current for both DC and AC. In the preceding portion of the switching cycle, defined as interval T1, the current sense circuit 114 provides emulated inductor current as the sensed inductor current. The emulated inductor current is generated based on slope sense and valley sense information acquired at the ends of intervals D1 and D2. Generation of emulated inductor current is described with reference to FIG. 3.

Figure 3:
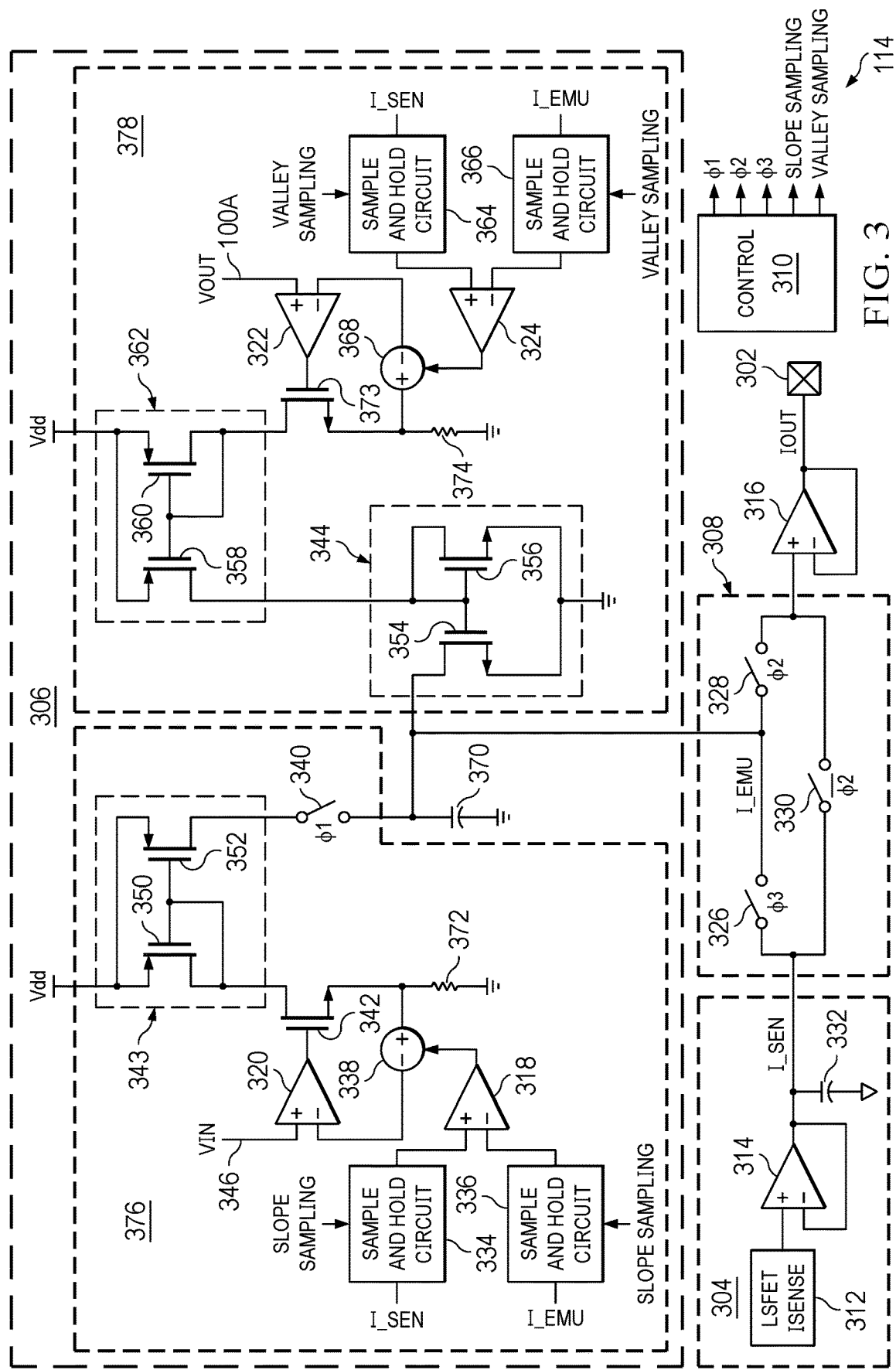
FIG. 3 is a schematic level diagram of an example of the hybrid emulation/measurement current sense circuit of FIG. 1.

FIG. 3 is a schematic level diagram of an example of the current sense circuit 114. The current sense circuit 114 includes a sense current output 302, an inductor current measurement circuit 304, an inductor current emulation circuit 306, a switch network 308, and a control circuit 310. The switch network 308 couples the sense current output 302 to an output of the inductor current measurement circuit 304 and an output of the inductor current emulation circuit 306. A buffer amplifier 316 couples the sense current output 302 to the switch network 308. The control circuit 310 is coupled to, and generates timing signals for controlling, the inductor current emulation circuit 306 and the switch network 308.

The inductor current measurement circuit 304 measures the current flowing in the inductor 106 by measuring the current flowing in the low-side switching transistor 104. The inductor current measurement circuit 304 includes a low-side transistor current sense circuit 312, a buffer amplifier 314, and a filter capacitor 332. The low-side transistor current sense circuit 312 may include one or more transistors arranged to generate a current that is proportional to the current flowing through the low-side switching transistor 104. For example, the low-side transistor current sense circuit 312 may include a sense transistor and/or transistors arranged as a sense resistance. The low-side transistor current sense circuit 312 may also include circuitry that converts the sensed current into a sense voltage (a current measurement signal (ISEN)) that is provided at the output of the low-side transistor current sense circuit 312. The buffer amplifier 314 is coupled to the output of the low-side transistor current sense circuit 312, and buffers the sense voltage. The output of the buffer amplifier 314 is coupled to the filter capacitor 332.

The switch network 308 switchably connects the inductor current measurement circuit 304 and the inductor current emulation circuit 306 to the sense current output 302. The switch network 308 includes a switch 326, a switch 328, and a switch 330. The switch 330 couples the output of the inductor current measurement circuit 304 to the sense current output 302 (via the buffer amplifier 316). The switch 328 couples the output of the inductor current emulation circuit 306 to the sense current output 302 (via the buffer amplifier 316). The switch 326 couples the output of the inductor current measurement circuit 304 to the output of the inductor current emulation circuit 306.

The inductor current emulation circuit 306 estimates the current flowing in the inductor 106 to generate a current emulation signal (I_EMU) based on the current measurement signal and the current emulation signal. The inductor current emulation circuit 306 includes a capacitor 370, a ramp-up circuit 376, and a ramp-down circuit 378. The capacitor 370 the current emulation signal. The ramp-up circuit 376 charges the capacitor 370 to emulate charging of the inductor 106 when the high-side switching transistor 102 is on. The ramp-down circuit 378 discharges the capacitor 370 to emulate discharging of the inductor 106 when the low-side switching transistor 104 is on.

The ramp-up circuit 376 includes a sample and hold circuit 334, a sample and hold circuit 336, an error amplifier 318, a voltage source 338, a difference amplifier 320, a transistor 342, a resistor 372, a current source circuit 343, and a switch 340. The switch 340 switchably connects the current source circuit 343 to the capacitor 370. The sample and hold circuit 334 is coupled to the output of the inductor current measurement circuit 304, and the sample and hold circuit 336 is coupled to the output of the inductor current emulation circuit 306. The sample and hold circuit 334 captures a sample of the current measurement signal, and the sample and hold circuit 336 captures a sample of the current emulation signal, at a time defined by the SLOPE SAMPLING signal generated by the control circuit 310. A first input of the error amplifier 318 is coupled to the output of the sample and hold circuit 334, and a second input of the error amplifier 318 is coupled to the output of the sample and hold circuit 336. The error amplifier 318 generates an error signal representative of the difference in the sampled current measurement signal and the sampled current emulation signal. The output of the error amplifier 318 is coupled to the voltage source 338. The voltage source 338 is coupled to a first input of the difference amplifier 320. The voltage source 338 is a dependent voltage source that is used to generate an offset to the difference amplifier 320, converting the error signal to an incremental change in current through the difference amplifier 320. A second input of the difference amplifier 320 is coupled to an input voltage terminal 346. The difference amplifier 320 generates an output signal representative of the difference in VIN received at the input voltage terminal 346 and the error signal offset by the voltage source 338. The output signal of the difference amplifier 320 drives the transistor 342 to sink a current from the current source circuit 343. The transistor 342 is coupled to ground via the resistor 372. The transistor 342 may be an n-channel field effect transistor (NFET). The current source circuit 343 is a current mirror circuit, and includes transistor 350 and transistor 352. The transistor 350 is diode-connected. The current flowing through the transistor 342 flows through the transistor 350. The transistor 352 mirrors the current flowing through the transistor 350 to charge the capacitor 370. The transistor 350 and the transistor 352 may be p-channel field effect transistors (PFETs).

The ramp-down circuit 378 includes a sample and hold circuit 364, and sample and hold circuit sample and hold circuit 366, an error amplifier 324, a voltage source 368, a difference amplifier 322, a transistor 373, a resistor 374, a current source circuit 362, and a current sink circuit 344. The sample and hold circuit 364 captures a sample of the current measurement signal, and the sample and hold circuit 366 captures a sample of the current emulation signal, at a time defined by the VALLEY SAMPLING signal generated by the control circuit 310. A first input of the error amplifier 324 is coupled to the output of the sample and hold circuit 364, and a second input of the error amplifier 324 is coupled to the output of the sample and hold circuit 366. The error amplifier 324 generates an error signal representative of the difference in the sampled current measurement signal and the sampled current emulation signal. The output of the error amplifier 324 is coupled to the voltage source 368. The voltage source 368 is coupled to a first input of the difference amplifier 322. A second input of the difference amplifier 320 is coupled to the output voltage terminal 100A.

The difference amplifier 322 generates an output signal representative of the difference in VOUT, received at the output voltage terminal 100A, and the error signal, output by the error amplifier 324, offset by the voltage source 368. The output signal of the difference amplifier 322 drives the transistor 373 to sink a current from the current source circuit 362. The transistor 373 is coupled to ground via the resistor 374. The transistor 373 may be an NFET. The current source circuit 362 is a current mirror circuit, and includes transistor 360 and transistor 358. The transistor 358 and the transistor 360 may be PFETs. The transistor 360 is diode-connected. The current flowing through the transistor 373 flows through the transistor 360. The transistor 358 mirrors the current flowing through the transistor 360. The current sink circuit 344 is coupled to the current source circuit 362, and sinks the current flowing through the transistor 358. The current sink circuit 344 is a current mirror circuit, and includes transistor 354 and transistor 356. The transistor 354 and the transistor 356 may be NFETs. The transistor 356 is diode-connected. The current flowing through the transistor 358 flows through the transistor 356. The transistor 354 is coupled to the capacitor 370, and mirrors the current flowing through the transistor 360 to discharge the capacitor 370.

Figure 4:
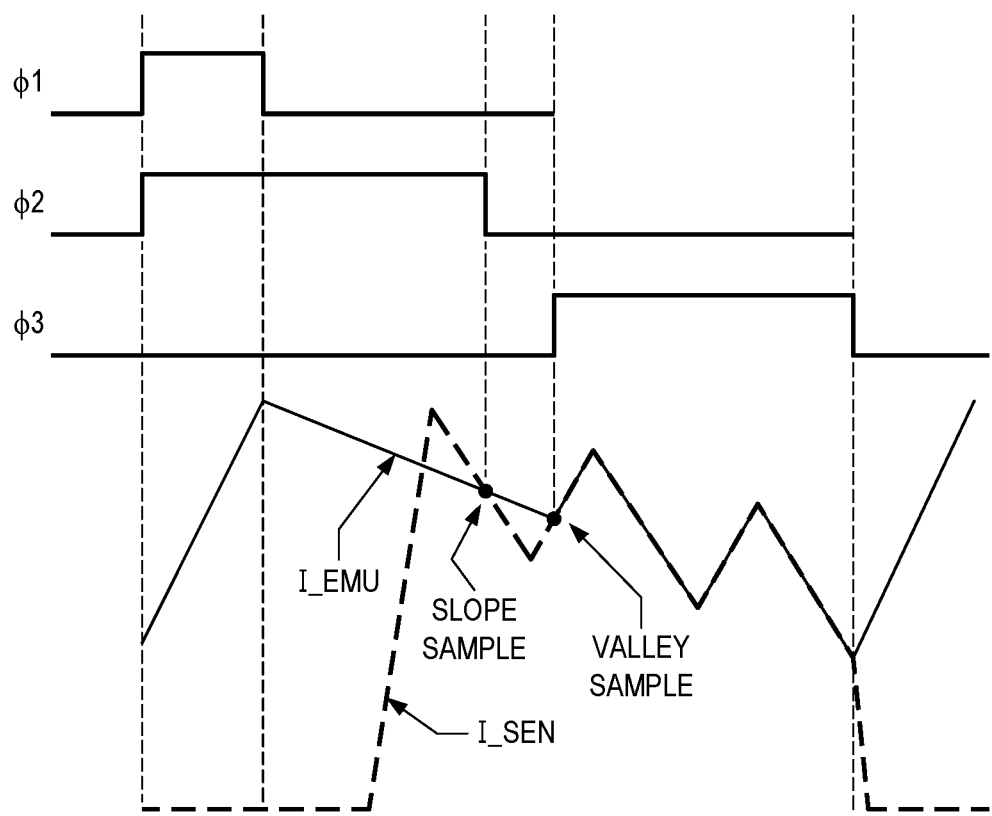
FIG. 4 is a graph of signals in the hybrid emulation/measurement current sense circuit of FIG. 3 illustrating operation thereof.

The control circuit 310 generates the timing signals that control the operation of the current sense circuit 114. FIG. 4 is a graph of signals in the current sense circuit 114. The signal Φ1 controls the switch 340. The signal Φ1 corresponds to the on time of the high-side switching transistor 102. The signal Φ1 closes the switch 340 when the high-side switching transistor 102 is on (to charge the capacitor 370), and opens the switch 340 when the high-side switching transistor is off.

The signal Φ2 controls the switch 328 and the switch 330. If the signal Φ2 is a logic low, the switch 330 is closed to couple the output of the inductor current measurement circuit 304 to the sense current output 302, and the switch 328 is open to isolate the output of the inductor current emulation circuit 306 from the sense current output 302. If the signal Φ2 is a logic high, the switch 328 is closed to couple the output of the inductor current emulation circuit 306 to the sense current output 302, and the switch 330 is open to isolate the output of the inductor current measurement circuit 304 from the sense current output 302. The signal Φ2 goes low a predetermined time (set by a timer circuit) after the low-side switching transistor 104 is turned on (approximately the time of the falling edge of the signal Φ1).

The signal Φ3 controls the switch 326. The signal Φ3 closes the switch 326 to couple the output of the inductor current measurement circuit 304 to the inductor current emulation circuit 306. The signal Φ3 goes high a predetermined time (set by a timer circuit) after the falling edge of the signal Φ2. When the switch 326 is closed the output of the inductor current emulation circuit 306 follows the output of the inductor current measurement circuit 304. The falling edge of the signal Φ3 corresponds to the end of the switching cycle.

The timing of slope and valley sampling correspond to falling edge of the signal Φ2 and the rising edge of the signal Φ3 respectively. The delays triggering these edges (triggering slope and valley sampling) can be tuned to optimize the performance of the DC-DC converter 100. The delay triggering the falling edge of the signal Φ2 is selected to blank out switching noise. The delay from the falling edge of the signal Φ2 to the rising edge of the signal Φ3 is selected to create a delta from slope to valley sampling so that the circuit can converge to the actual slopes correctly.

Figure 5:
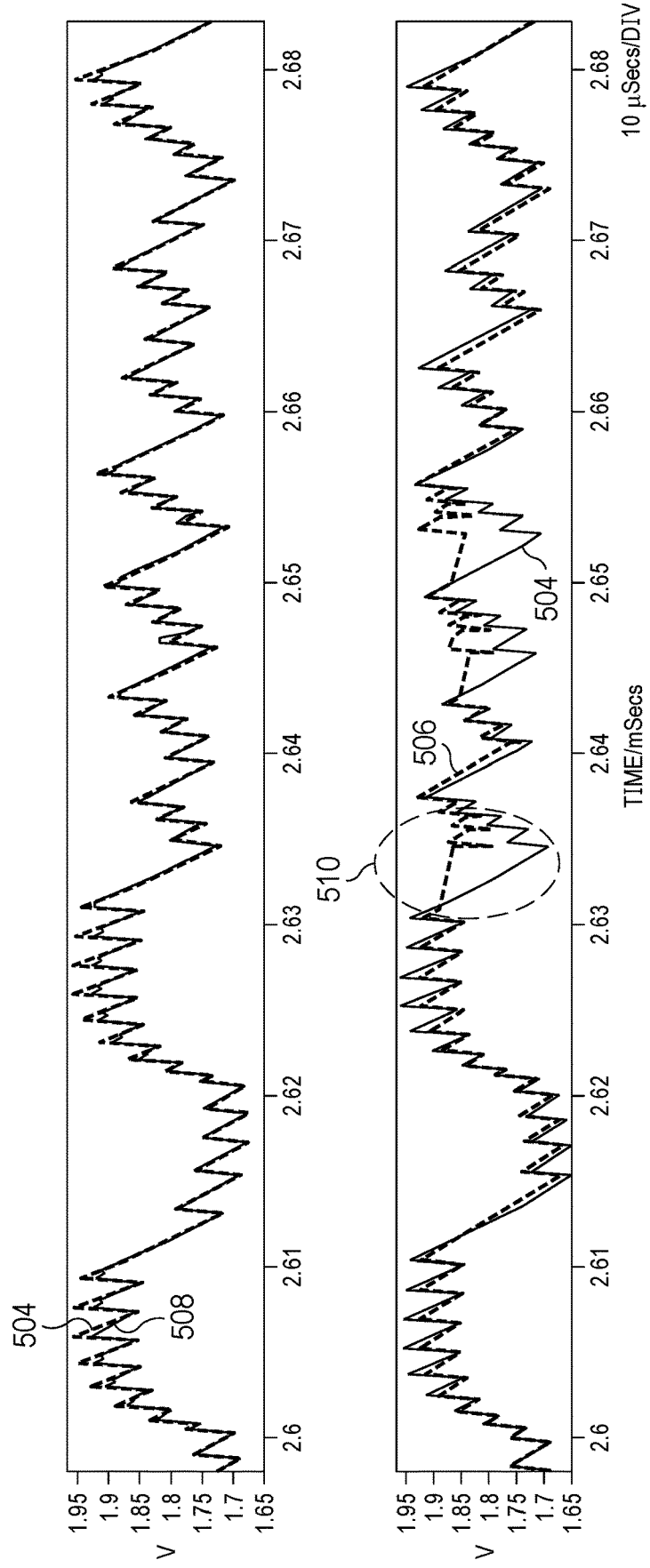
FIG. 5 is a graph of signals comparing current sensed in a buck DC-DC converter with and without the hybrid emulation/measurement current sense circuit of FIG. 3.

FIG. 5 is a graph of signals comparing current sensed in a DC-DC converter with and without a hybrid emulation/measurement current sense circuit. FIG. 5 shows a PWM signal 502 driving the low-side switching transistor 104, actual inductor current 504, sensed inductor current 506 without a hybrid emulation/measurement current sense circuit, and sensed inductor current 508 with the current sense circuit 114. The sensed inductor current 506 has substantial error and takes multiple PWM cycles to re-track the 504 (e.g., in interval 510). The 508 shows that with the current sense circuit 114 a DC-DC converter the sensed current closely tracks the actual inductor current 504, which results in much better transient response than without the current sense circuit 114.

Figure 6:
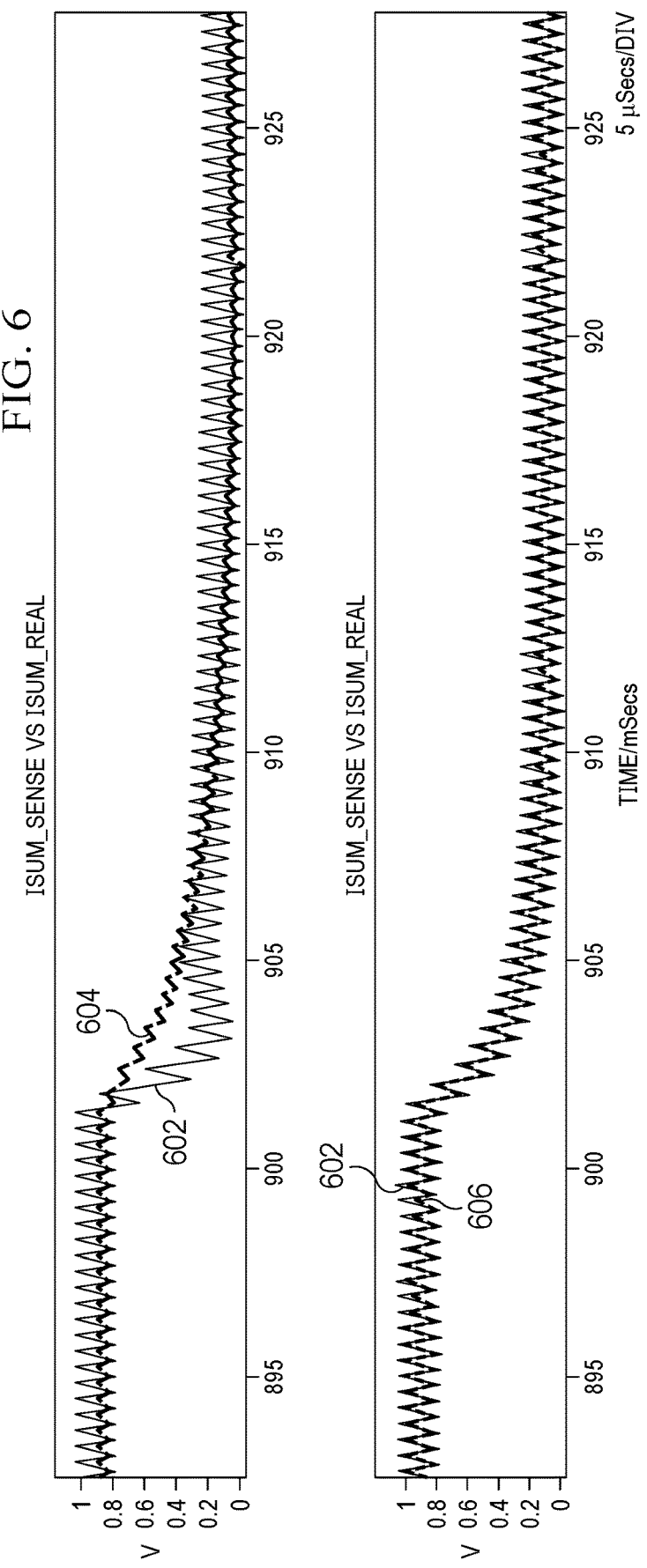
FIG. 6 is a graph of current sensed in a trans-inductor voltage regulator with and without the hybrid emulation/measurement current sense circuit of FIG. 3.

FIG. 6 is a graph of current sensed in a trans-inductor voltage regulator with and without the current sense circuit 114. FIG. 6 shows a sum of actual inductor current 602, a sum of sensed inductor current 604 without a hybrid emulation/measurement current sense circuit, and a sum of sensed inductor current 606 with the current sense circuit 114. The error in the 604 is substantial, which increases transient response. The 606 closely tracks the actual inductor current, which reduces transient response.

Figure 7:
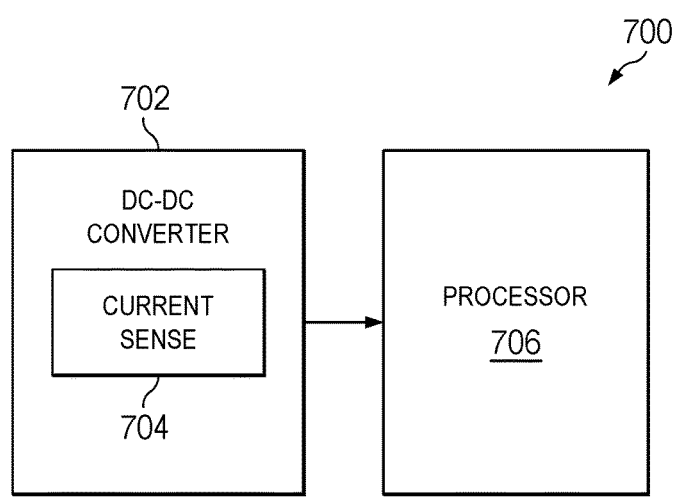
FIG. 7 is a block diagram for an example processor system that includes a buck DC-DC converter with the hybrid emulation/measurement current sense circuit of FIG. 3.

FIG. 7 is a block diagram for an example processor system 700. The processor system 700 includes a buck DC-DC converter 702 and a processor 706. The processor 706 may be a CPU, a GPU, communication processor, a field programmable gate array, or other digital circuit. The buck DC-DC converter 702 generates an output voltage for powering the processor 706. The buck DC-DC converter 702 includes a current sense circuit 704 that is an implementation of the current sense circuit 114 to improve the transient response of the buck DC-DC converter 702.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a field effect transistor ("FET") (such as an NFET or a PFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References herein to a FET being "on" means that the conduction channel of the FET is present and drain current may flow through the FET. References herein to a FET being "off" means that the conduction channel is not present and drain current does not flow through the FET. An "off" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. A circuit, comprising:
   a sense current output;
   a current measurement circuit having an output; and
   a current emulation circuit having an output, the current emulation circuit comprising:
      a first sample and hold circuit coupled to the output of the current measurement circuit;
      a second sample and hold circuit coupled to the output of the current emulation circuit; and
      an error amplifier having a first input, a second input, and an output, the first input coupled to the first sample and hold circuit and the second input coupled to the second sample and hold circuit;
   a first switch coupled between the output of the current measurement circuit and the sense current output; and
   a second switch coupled between the output of the current emulation circuit and the sense current output.

2. The circuit of claim 1, wherein the current measurement circuit includes a third switch coupled between the output of the current measurement circuit and the output of the current emulation circuit.

3. The circuit of claim 1, wherein the current emulation circuit includes:
   a capacitor coupled to the output of the current emulation circuit;
   a current source circuit coupled to the capacitor; and
   a current sink circuit coupled to the capacitor.

4. The circuit of claim 3, wherein the current emulation circuit includes a switch coupled between the current source circuit and the capacitor.

5. The circuit of claim 3, wherein the error amplifier has an output coupled to the current source circuit.

6. The circuit of claim 5, further comprising:
   an input voltage terminal;
   wherein circuit further comprises:
      a difference amplifier including:
         a first input coupled to the input voltage terminal;
         a second input coupled to the output of the error amplifier; and
         an output coupled to the current source circuit.

7. The circuit of claim 3, wherein the error amplifier has an output coupled to the current sink circuit.

8. The circuit of claim 7, further comprising:
   an output voltage terminal;
   wherein the current sink circuit includes:
   a difference amplifier including:
      a first input coupled to the output voltage terminal;
      a second input coupled to the output of the error amplifier; and
      an output coupled to the current sink circuit.

9. A power converter, comprising:
   a sense current output;
   a current measurement circuit configured to generate a current measurement signal;
   a current emulation circuit configured to generate a current emulation signal, the current emulation circuit comprising:
      a capacitor;
      a first circuit configured to charge the capacitor;
      a second circuit configured to discharge the capacitor; and
      a switch coupled between the first circuit and the capacitor; and
   a switch network coupled to the sense current output, the current measurement circuit, and the current emulation circuit, and configured to switch the current emulation signal to the sense current output during a first portion of a power converter switching cycle, and switch the current measurement signal to the sense current output during a second portion of the power converter switching cycle, and the switch configured to switch a charging current from the first circuit to the capacitor during a sub-portion of the first portion of the power converter switching cycle.

10. The DC-DC power converter of claim 9, wherein the switch network includes:
    a first switch coupled between an output of the current measurement circuit and the sense current output, the first switch configured to switch the current measurement signal to the sense current output; and
    a second switch coupled between an output of the current emulation circuit and the sense current output, the second switch configured to switch the current emulation signal to the sense current output.

11. The power converter of claim 10, wherein the switch network includes a third switch coupled between the output of the current measurement circuit and the output of the current emulation circuit, the third switch configured to switch the output of the current measurement circuit to the output of the current emulation circuit.

12. The power converter of claim 9, wherein:
    the current emulation circuit includes:
       a first sample and hold circuit configured to sample the current measurement signal at a first time;
       a second sample and hold circuit configured to sample the current emulation signal at the first time; and
       a first error amplifier coupled to the first sample and hold circuit and the second sample and hold circuit, and configured to:
          generate an error signal representative of a difference in the current measurement signal and the current emulation signal; and
          provide the error signal to the first circuit.

13. The power converter of claim 12, wherein:
    the current emulation circuit includes:
       a third sample and hold circuit configured to sample the current measurement signal at a second time;
       a fourth sample and hold circuit configured to sample the current emulation signal at the second time; and
       a second error amplifier coupled to the third sample and hold circuit and the fourth sample and hold circuit, and configured to:
          generate an error signal representative of a difference in the current measurement signal and the current emulation signal; and
          provide the error signal to the second circuit.

14. A system, comprising:
    an inductor having a first terminal and a second terminal;
    a first transistor having a current terminal coupled to the first terminal of the inductor;
    a second transistor having a current terminal coupled to the current terminal of the first transistor and to the first terminal of the inductor;
    a current measurement circuit having an input and an output, the input coupled to the second transistor;
    a current emulation circuit having an output;
    a first switch having a first terminal and a second terminal, the first terminal coupled to the output of the current measurement circuit;
    a second switch having a first terminal and a second terminal, the first terminal coupled to the output of the current emulation circuit and the second terminal coupled to the second terminal of the first switch; and a third switch having a first terminal and a second terminal, the first terminal coupled to the first terminal of the first switch and the second terminal coupled to the first terminal of the second switch.

15. The system of claim 14, wherein the current emulation circuit includes:
a capacitor coupled to the output of the current emulation circuit;
a current source circuit coupled to the capacitor; and
a current sink circuit coupled to the capacitor.

16. The system of claim 15, wherein the current emulation circuit includes a fourth switch coupled between the current source circuit and the capacitor.

17. The system of claim 15, wherein the current emulation circuit includes:
a first sample and hold circuit coupled to the output of the current emulation circuit;
a second sample and hold circuit coupled to the output of the current emulation circuit; and
an error amplifier including:
a first input coupled to the first sample and hold circuit;
a second input coupled to the second sample and hold circuit; and
an output coupled to the current source circuit.

18. The system of claim 15, wherein the current emulation circuit includes:
a first sample and hold circuit coupled to the output of the current emulation circuit;
a second sample and hold circuit coupled to the output of the current emulation circuit; and
an error amplifier including:
a first input coupled to the first sample and hold circuit;
a second input coupled to the second sample and hold circuit; and
an output coupled to the current sink circuit.

19. The system of claim 14, wherein the current emulation circuit further has a first input and a second input, the first input coupled to the second terminal of the second switch and the second input coupled to the first terminal of the second switch.

20. The system of claim 19, wherein the current emulation circuit comprises:
a ramp-up circuit coupled to the first input, the second input, and the output; and
a ramp-down circuit coupled to the first input, the second input, and the output.

* * * * *